(12) United States Patent
van den Akker

(10) Patent No.: US 6,425,969 B1
(45) Date of Patent: Jul. 30, 2002

(54) METHOD FOR THE PRODUCTION OF A TRANSVERSE WEB

(75) Inventor: Martinus C. A. van den Akker, Tilburg (NL)

(73) Assignee: Beiler Beheer B.V. (NL)

( * ) Notice: Subject to any disclaimer, the term of this patent is extended or adjusted under 35 U.S.C. 154(b) by 0 days.

(21) Appl. No.: 09/444,599

(22) Filed: Nov. 22, 1999

Related U.S. Application Data

(63) Continuation of application No. PCT/NL98/00287, filed on May 20, 1998.

(30) Foreign Application Priority Data

May 21, 1997 (NL) ............................................... 1006092

(51) Int. Cl.$^7$ ............................................. B29C 70/16
(52) U.S. Cl. ....................... 156/177; 156/178; 156/179; 156/258; 156/266; 156/270; 156/304.1
(58) Field of Search ................................. 156/177, 178, 156/179, 258, 266, 269, 270, 304.1

(56) References Cited

U.S. PATENT DOCUMENTS 3,591,434 A  *  7/1971  Harstein

FOREIGN PATENT DOCUMENTS

| FR | 1595577 | 6/1970 |
| GB | 2009270 | 6/1979 |
| WO | 9500318 | 1/1995 |

OTHER PUBLICATIONS

Section CH, Week 8025, Derwent Publications Ltd., London, GB; Class A14, AN 80–44151C, XP002055522 & JP 55 062260 A (Nippon Petrochemicals Co Ltd), May 10, 1980 see abstract.

* cited by examiner

*Primary Examiner*—Sam Chuan Yao
(74) *Attorney, Agent, or Firm*—Ostrolenk, Faber, Gerb & Soffen, LLP

(57) ABSTRACT

A transverse fiber web includes a base stabilizing layer, a fiber layer and a second stabilizing layer. A longitudinal fiber web with sides that are substantially parallel to the fibers is cut into web parts, which are then reassembled to form the transverse fiber web. The fibers of the transverse fiber web form angle with a longitudinal direction of the transverse fiber web that is greater than 0°. The material selected for the base stabilizing layer can absorb tensile forces in the longitudinal direction of the transverse fiber web to increase the stability of the transverse fiber web during manufacture. The wed parts used in the assembly of the transverse fiber web can be complementary shaped to interlock with each other, or can overlap to permit flexible assembly of the transverse fiber web.

8 Claims, 4 Drawing Sheets

METHOD FOR THE PRODUCTION OF A TRANSVERSE WEB

CROSS REFERENCE TO RELATED APPLICATION

This is a continuation application of International Application PCT/NL98/00287, with an International filing date of May 20, 1998.

BACKGROUND OF THE INVENTION

The invention relates to a method for the production of a transverse fibre web with substantially parallel fibres in a fibre layer, the direction of the fibres in the fibre layer forming an angle of greater than 0° with the longitudinal direction of the transverse fibre web.

WO-95/00318 has disclosed a method for the production of a transverse fibre web of this kind. Firstly, a longitudinal fibre web is produced, by placing yarns which are impregnated with a matrix material on a separating layer. The separating layer consists of a material which adheres to the fibre layer just sufficiently to ensure a fixed position of the yarns with respect to one another and the separating layer. Then, web parts are cut from the longitudinal fibre web. These web parts are placed next to one another, in such a manner that the fibres of the various web parts run parallel to one another and form an angle of between 0° and 90° with the longitudinal direction of the transverse fibre web formed in this way. Then, the separating layers of adjacent web parts are connected to one another by means, for example, of single-sided or double-sided adhesive tape which extends in the direction of the join between the adjacent web parts. The result is a separating layer which is composed of parts and has sufficient strength to be able to take up tensile forces in the longitudinal direction of the transverse fibre web formed without the fibre layer tearing.

Then, a third layer, which is fixedly connected to the fibre layer and can adopt the stabilizing function of the separating layer, is applied to the fibre layer. After this, the separating layer is removed from the transverse fibre web, an operation which is possible without the fibre layer tearing, because the separating layer is not firmly connected to the fibre layer. A transverse fibre web of this kind is used for the production of laminates comprising fibre layers lying on top of one another, with the fibres in one fibre layer running parallel to one another, but the fibres in successive fibre layers forming an angle with one another.

The drawback of the known method is that the use of a separating layer which has to be removed entails considerable costs, for example with regard to processing of waste. Particularly when processing the most common fibres used, the use of a separating layer has an adverse effect on the production costs. The relationship between the costs of waste processing and the costs of the end product is too high when fibres of this kind are used.

The object of the present invention is to provide a method for the production of a transverse fibre web in which it is not necessary to use a separating layer, so that the quantity of waste is considerably reduced.

This object is achieved by means of a method for the production of a transverse fire web according to claim 1.

With the method according to the invention, the base stabilizing layer does not have to be replace, so that there is no waste, a fact which reduces the production costs.

GB-A-2.009.270 discloses a method for providing a rubber sheet with reinforcing fibres, where the fibres are made of metal or some other material which has a strength comparable to that of metal. Characteristic values for the diameter of the fibres used in this method lie between 0.1 mm and 1.0 mm. The metal elements are formed into a helix, and are formed into a longitudinal fibre web by coating the fibres metal elements with rubber. The resulting fibre web has sufficient thickness and strength for handling the sheet without the necessity of applying a separate carrier layer or stabilizing layer. For forming a transverse fibre web, web parts are cut off of the longitudinal fibre web and attached to one another in a transverse direction.

This publication does not disclose a cross-ply, i.e. a textile product having two or more fibre layers, wherein the fibre directions in successive fibre layers form an angle with respect to one another. The rubber sheet with transverse metal reinforcing elements formed by the method as disclosed in the publication is used as reinforcement in tires, for instance for vehicles. The thickness of the transverse fibre web of this publication is larger than the diameter of the fibres employed.

The diameter of the fibres employed in the method according to the invention is less than 50 µm, with the possibility, for example, of using fibres which have a diameter of 10 µm or even less. The thickness of the base stabilizing layer and the eventual second stabilizing layer employed is of the same order of magnitude. Moreover, the fibres in the fibre layer bear against one another, so that the ratio of the weight of fibres to the total weight of the base stabilizing layer and the eventual second stabilizing layer is as high as possible.

FR-A-1.595.577 relates to a method for the production of a cross-ply, wherein a transverse fibre web is produced as an intermediate product. Fibres are arranged in the longitudinal direction on a thermoplastic stabilizing layer with a thickness of between 0.5 and 1 mm.

SUMMARY OF THE INVENTION

Web parts are cut off the longitudinal fibre web produced in this way, which comprises one base stabilizing layer and one fibre layer, which web parts are then attached to one another in such a manner that the transverse fibre web is formed. A second layer of fibres is then arranged on that side of the thermoplastic stabilizing layer which is situated opposite the fibres, in the longitudinal direction of the transverse fibre web. The result is a cross ply which comprises a thermoplastic stabilizing layer with fibres on both sides, which fibres form an angle with one another. The web parts are attached to one another by placing an edge section of one web part over an edge section of another web part, and by thermally welding the overlapping edge section to each other. The method disclosed in this publication also does not allow the production of a transverse fibre web having a thickness of less than 50 µm.

A further advantage or the method according to the invention can be achieved if the material used for the base stabilizing layer has properties which are suitable for the end product which is produced from the transverse fibre web. It is particularly advantageous to use a film, a fibre fabric or a thermosetting material for the base stabilizing layer.

Further advantage is obtained if an identical material is used far the base stabilizing layer, the fibre layer and the second stabilizing layer. End products which are produced from the transverse fibre web according to the invention cam be recycled in a simple manner at the end of a service life cycle.

Preferably, the longitudinal sides of the longitudinal fibre web are formed in such a manner that they are complementary to one another, with the result that a strong join can be formed between the web parts.

Further advantage results if a transverse fibre web is used for the base stabilizing layer, so that a cross ply is formed. The cross ply is immediately ready for further processing.

The invention also relates to a transverse fibre web which is produced using the method according to the invention.

The invention furthermore relates to a device for the production of a cross ply, which uses a transverse fibre web which is produced using the method according to the invention.

BRIEF DESCRIPTION OF THE DRAWINGS

The invention will be explained in more detail below with reference to the drawing, in which.

DESCRIPTION OF THE PREFERRED EMBODIMENT

Figure 1:
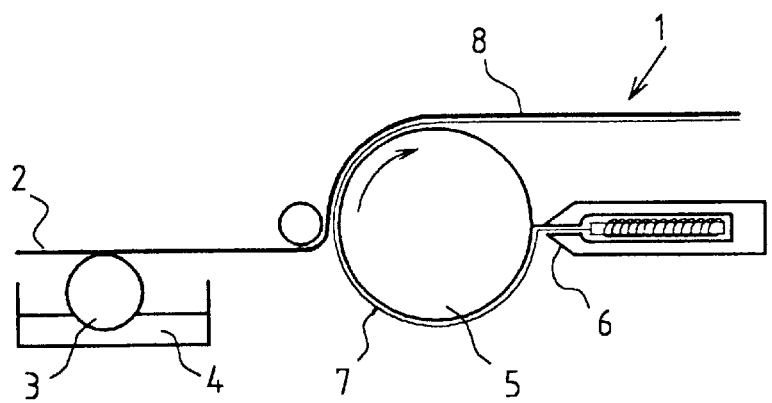
FIG. 1 is a diagrammatic depiction of the production of a longitudinal fibre web.

FIG. 1 diagrammatically depicts how a longitudinal fibre web 1 is produced for the method according to the invention. Yarns 2 formed from fibres run over a roll 3 which rotates through a bath of matrix material 4. In this way, the yarns 2 are impregnated with matrix material 4. Then, the yarns 2 which have been impregnated with matrix material are guided to a roller 5, where they form a fibre layer 8. The material for a base stabilizing layer 7 is applied to this roller 5 with the aid of a nozzle 6. The temperature of the roller 5 is such that the yarns 2 which have been impregnated with matrix material 4 adhere well to the base stabilizing layer 7 applied to the roller 5. Then, the assembly is cooled so that a fixed join between the fibre layer 8 impregnated with matrix material 4 and the base stabilizing layer 7 is formed, the yarns 2 being immovable with respect to one another. The longitudinal fibre web 1 produced in this way is wound onto a reel and transported to a device where it is cut into web parts 9, after which the web parts 9 are attached to one another so as to produce a transverse fibre web 10 (cf. FIG. 3).

Figure 2:
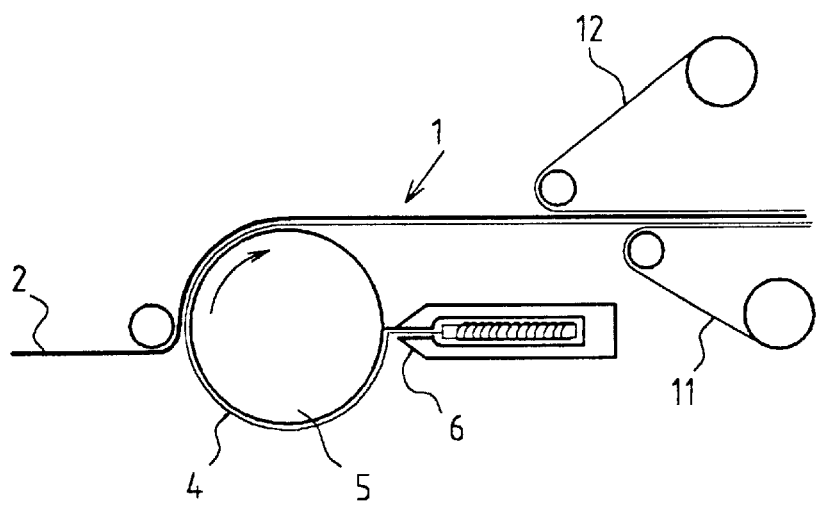
FIG. 2 is a diagrammatic depiction of the production of a longitudinal fibre web, a film being applied to the underside and top side of the longitudinal fibre web.

FIG. 2 diagrammatically depicts another method of producing a longitudinal fibre web 1 for the method according to the invention. The matrix material 4 is heated in, for example, an extruder (not shown), after which the matrix material 4 is pressed towards the nozzle 6 with the aid of a pump (not shown). The nozzle 6 applies the matrix material 4 to the temperature-controlled roller 5. The yarns 2 are also guided towards the roller 5. As a result of correctly setting the temperature of the roller 5, the matrix material 4 has a viscosity and layer thickness which are such that the yarns 2 are impregnated when the yarns 2 are pressed into the matrix material 4. When a suitable matrix material 4 is used, this already provides sufficient strength to allow a transverse fibre web 10 to be produced from the longitudinal fibre web 1 produced in this way. If necessary, a bottom film 11 may be applied. Depending on the use, a top film 12 may also be applied. The longitudinal fibre web 1 produced in this way consequently comprises a fibre layer 8 impregnated with matrix material 4, a bottom film 11 and a top film 12. An additional advantage of the use of a bottom film 11 and a top film 12 is that the bottom film 11 and the top film 12 may have different properties. In this way, it is possible to combine a plurality of properties in one transverse fibre web 10.

Instead of a film, it is possible to use a fibre fabric on both sides or on one of the two sides. A fibre fabric, which is also known as a nonwoven, comprises fibres which are randomly distributed in a plane and are thermally or mechanically connected to one another. In a fibre fabric, it is not possible to specify a principal direction for the fibres. It is also possible to realize a combination of a film on one side of the fibre layer and a fibre fabric on the other side of the fibre layer, in the manner described above.

The selection of the material for the base stabilizing layer 7 and the films and/or fibre fabrics employed determines, inter alia, the properties of the end product. The method according to the invention is particularly suitable for the production of a textile product with controlled properties relating to the air permeability. Textile products with properties of this nature are used for the production of, for example, sailcloth, airbags and canvas.

Figure 2A:
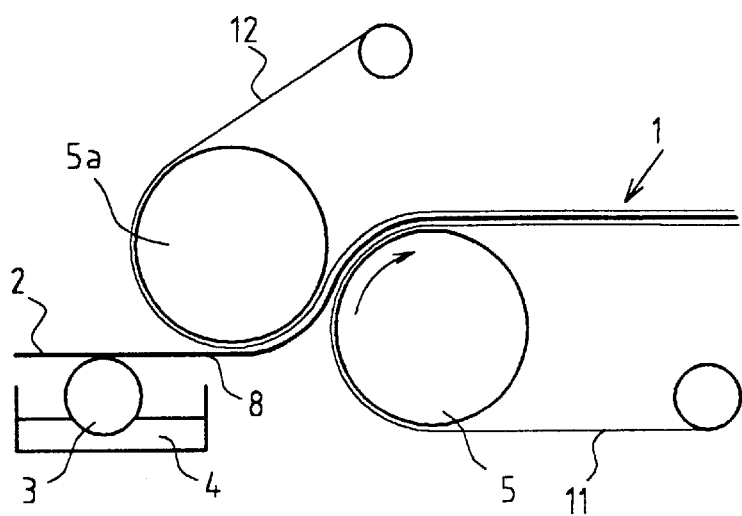
FIG. 2a is a diagrammatic depiction of the production of a longitudinal fibre web, the base stabilizing layer being formed by a film, FIG. 3 diagrammatically depicts a cutting machine for cutting a longitudinal fibre web into web parts and forming a transverse fibre web.

FIG. 2a diagrammatically depicts how a longitudinal fibre web for the method according to the invention is produced from fibres 2 which are impregnated with a matrix material 4. The fibres 2 run over a roll 3 which rotates through a tray containing matrix material 4. The matrix material 4 may be a dispersion adhesive or a hot melt adhesive. The fibres 2 which have been impregnated with matrix material 4 pass between two rollers 5, 5a. A film 11 is applied by roll 5 and a film 12 by roll 5a. The fibre layer 8 which has been impregnated with matrix material 4 is firmly connected to the films 11, 12 so as to form the longitudinal fibre web 1. Here too, one or both films 11, 12 may be replaced with a fibre fabric. Instead of film 11, it is also possible to supply web parts (9) emanating from a cutting machine to the roll 5.

Figure 3:
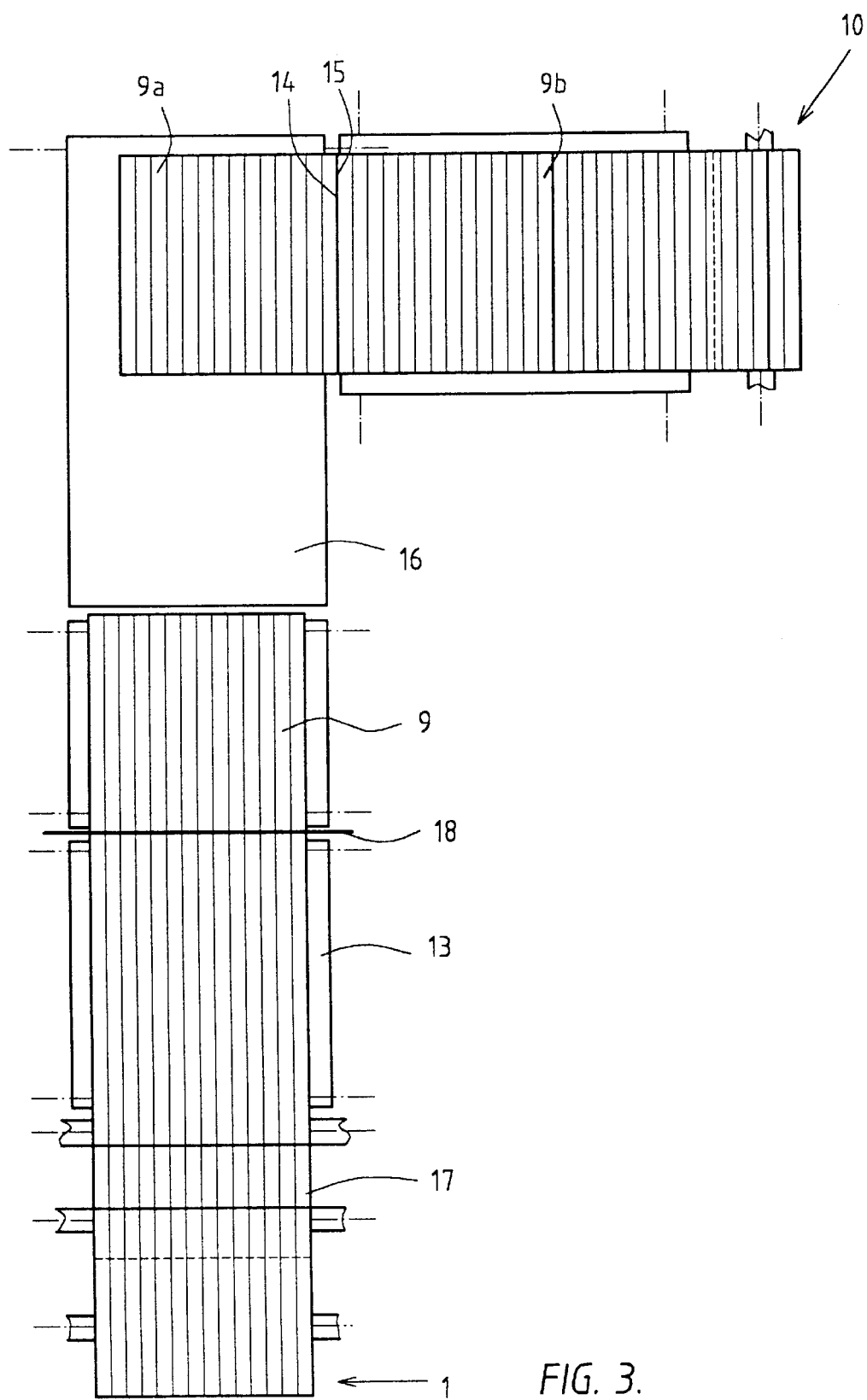

FIG. 3 diagrammatically depicts a cutting machine which is used to cut the longitudinal fibre web 1 into web parts 9 so as to form the transverse fibre web 10. The reel with the longitudinal fibre web 1 is unwound onto a conveyor belt 13, the conveyor belt 13 moving the longitudinal fibre web 1 in steps in the longitudinal direction of the fibres 2. To unwind the reel with the longitudinal fibre web 1 in steps, it is necessary to overcome high inertia forces. This is an undesirable situation, since considerable time and energy is lost accelerating and decelerating the reel holding the longitudinal fibre web 1. In order to allow the reel holding the longitudinal fibre web 1 to be unwound continuously, the longitudinal fibre web is hung in a loop 17 which serves as a buffer for the cutting machine. The stepwise movement of the longitudinal fibre web 1 on the cutting machine and the unwinding rate of the reel of longitudinal fibre web 1 are matched to one another. The longitudinal fibre web 1 passes onto a first conveyor belt 13 of the cutting machine and then onto a second conveyor belt 16. When the longitudinal fibre web 1 on the cutting machine has covered a distance which corresponds to the width of the transverse fibre web 10 to be produced, the conveying of the longitudinal fibre web 1 on the cutting machine stops. Then, a web part 9 is cut off the longitudinal fibre web 1 by a cutting blade 18. The web part 9 cut off is displaced by the conveyor belt 16 in the fibre direction until the web part 9 reaches the position in which it has to be displaced in the transverse direction and attached to previous web parts. A web part 9a illustrated in FIG. 3 is displaced in the transverse direction, with a longitudinal side 14 in the position in which it adjoins a longitudinal side 15 of a web part 9b in a predetermined manner. With the aid of heat, adhesive or double-sided adhesive tape, the longitudinal sides 14, 15 of the web parts 9a, 9b are attached to one another, so that a transverse fibre web 10 is produced. By winding the transverse fibre web 10 onto a reel, the web part 9a moves in a direction transverse to the fibre direction, which corresponds to the longitudinal direction of the transverse fibre web. The web part 9 is then moved into the position in which it can be joined to the web part 9a. The transverse fibre web 10 is wound onto a reel, it being possible to use a buffer, in the form of a loop in the transverse fibre web 10, before the reel, so that here too it is possible to dispense with accelerating and decelerating the reel holding the transverse fibre web 10.

To produce the transverse fibre web 10, it is necessary for the longitudinal sides of the longitudinal fibre web 1 to have a form which is such that a strong join can be obtained between the web parts 9 cut from the longitudinal fibre web 1. In order to achieve this, during the production of the longitudinal fibre web the various layers are positioned in such a manner with respect to one another that the longitudinal sides of the longitudinal fibre web 1 are of complementary form. This means that the longitudinal side of the web part 9 accurately adjoins, in a predetermined manner, the corresponding longitudinal side of the web part 9a to which it is joined.

Figure 4:
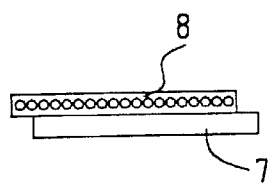
FIG. 4 is a cross-section through a longitudinal fibre web, in which the fibre layer and the stabilizing layer are displaced in the transverse direction with respect to one another.
Figure 5:
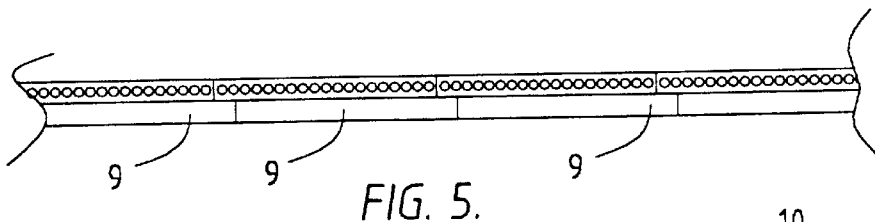
FIG. 5 is a longitudinal section through a transverse fibre web produced with the aid of web parts cut from the longitudinal fibre web shown in FIG. 4.

FIG. 4 shows an example of a cross-section through a longitudinal fibre web 1, with the fibre layer 8 which is impregnated with matrix material 4 projecting on one longitudinal side of the longitudinal fibre web 1 beyond the edge of the base stabilizing layer 7, while on the other longitudinal side of the longitudinal fibre web 1 the base stabilizing layer 7 projects the same distance beyond the corresponding edge of the fibre layer 8. The longitudinal sides of web parts 9 are consequently of complementary form to one another. When identical web parts 9 are placed next to one another, the result is a transverse fibre web 10 as illustrated diagrammatically and in longitudinal section in FIG. 5. Due to the fact that the longitudinal sides of the web parts 9 accurately adjoin one another in a predetermined manner, a transverse fibre web 10 whose thickness is uniform over the entire length of the transverse fibre web 10 is produced. There is thus no thickening of the transverse fibre web 10 at the location of the join. A uniform thickness is important above all when the transverse fibre web 10 is used for the production of products in which a large number of fibre layers are pressed onto one another or in which the properties have to be constant over the entire surface, such as for example bulletproof vests and sailcloth. It is important that the material selected for the matrix and/or the stabilizer has sufficient strength, after the web parts 9 have been attached to one another, to withstand the stress applied transversely to the yarns 2 during winding onto the reel.

In the event that thermoplastic materials are used for the matrix and/or the stabilizer, the web parts 9 can be attached to one another with the aid of a hot melt technique. After the web parts 9 have been positioned with respect to one another, the area of the join is heated to above the softening point of the matrix material and/or the stabilizer material. Then, the web parts 9 are pressed together with force in the region of the join and cooled until the join obtained is strong enough to withstand the tensile stress exerted while the transverse fibre web 10 is being wound onto a reel.

Figure 6:
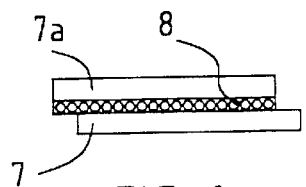
FIG. 6 is a cross-section through a longitudinal fibre web, the fibre layer of which is provided on both sides with a stabilizing layer.
Figure 7:
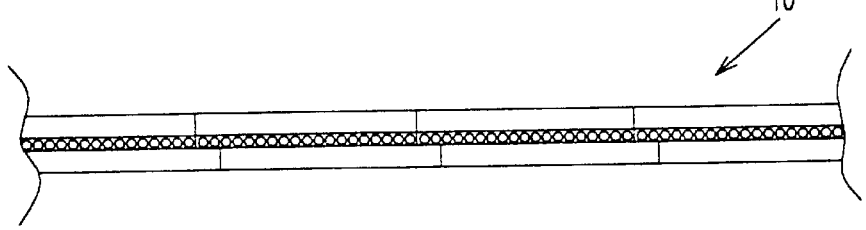
FIG. 7 is a longitudinal section through a transverse fibre web produced with the aid of web parts cut from the longitudinal fibre web shown in FIG. 6.

FIG. 6 depicts a cross-section through a longitudinal fibre web 1 with a fibre layer 8, with a second stabilizing layer 7a applied that side of the fibre layer 8 which is situated opposite the base stabilizing layer 7. With the web parts 9 cut from the longitudinal fibre web 1 shown in FIG. 6, it is possible to produce a transverse fibre web 10, a longitudinal section through which is illustrated in FIG. 7. Preferably, the material of the base stabilizing layer 7 or of the second stabilizing layer 7a is selected in such a manner that a longitudinal fibre layer can be applied to the transverse fibre web 10 such that it adheres successfully.

Figure 8:
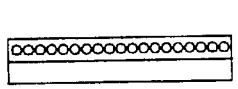
FIG. 8 is a cross-section through a longitudinal fibre web in which the side edges of the fibre layer and the stabilizing layer lie in one plane.
Figure 10:
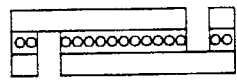
FIG. 10 is a cross-section through a longitudinal fibre web, the fibre layer of which is provided on both sides with stabilizing layers which are displaced in the transverse direction with respect to one another, cutouts being arranged in the fibre layer at the location of the longitudinal sides of the longitudinal fibre web.
Figure 9:
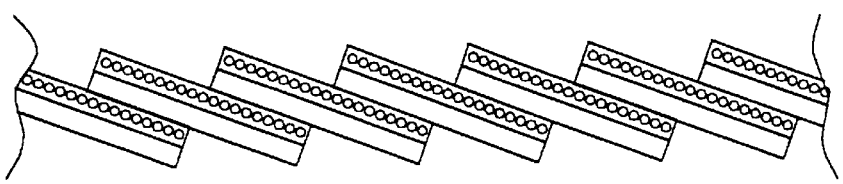
FIG. 9 is a longitudinal section through a transverse fibre web produced with the aid of web parts cut from the longitudinal fibre web shown in FIG. 8.
Figure 11:
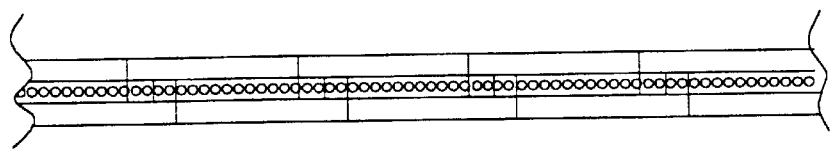
FIG. 11 is a longitudinal section through a transverse fibre web produced with the aid of web parts cut from the longitudinal fibre web shown in FIG. 10.

FIG. 8 depicts a cross-section through a longitudinal fibre web 1 in which the edges of the fibre layer 8 and the base stabilizing layer 7 lie in one plane. The web parts 9 cut off a longitudinal fibre web 1 of this kind may, for example, be laid half on top of one another, as illustrated in FIG. 9, and then passed between heated rollers, with the result that the fibre layers and the stabilizing layers shift into one another. Then, the transverse fibre web is cooled, resulting in a transverse fibre web with two stabilizing layers and two fibre layers, with the stabilizing layers and the fibre layers alternating. In this way, a transverse fibre web with two fibre layers is produced in one production step. This offers considerable advantages for the production of textile products with a plurality of fibre layers.

If the strength in the longitudinal direction of the transverse fibre web 10 is insufficient to take up a tensile force, a top film 12 may be applied to the transverse fibre web 10.

Another possibility is to use the matrix as the base stabilizing layer 7, in which case the thickness of the matrix is decisive for the strength in the longitudinal direction of the transverse fibre web 10.

To produce a transverse fibre web 10 from web parts 9 which have been cut from a longitudinal fibre web 1, it is important that the longitudinal sides of the base stabilizing layer 7 in the longitudinal fibre web 1 are substantially parallel to the yarns 2 in the fibre layer 8. This is achieved by guiding the yarns 2 from a yarn stenter through combs and arranging the yarns 2 with sufficient stress in the matrix material 4 and cooling the matrix material 4 sufficiently quickly for the yarns to be unable to move further in the matrix.

The layer thickness of the matrix is dependent on the thickness of the yarns 2 employed. If it is desired for the fibre layer 8 to have a low thickness, the yarns 2 may be forced apart by means of spreader pins, so that the fibres of the yarns 2, which have a lower thickness than the original yarns 2, are spread apart. A greater thickness of the fibre layer 8 can be achieved by employing yarns which consist, for example, of twisted fibres. The layer thickness of the matrix is adapted to the thickness of the yarns 2 employed.

A transverse fibre web produced according to the method of the invention can be used to produce a textile product in which the fibre directions in successive fibre layers form an angle with respect to one another. A textile product of this kind can be produced from transverse fibre webs in which the angles between the fibre direction and the longitudinal direction of the transverse fibre web are different. A textile product of this kind is known as a cross ply. A cross ply may, for example, also be produced by using a transverse fibre web as the base stabilizing layer during the production of a longitudinal fibre web. Yarns are then applied to the transverse fibre web directly in the longitudinal direction of the transverse fibre web. In this case, it is not always necessary to impregnate the fibres with a matrix material. If desired, the fibres may nevertheless be impregnated with a matrix material and, if appropriate, a film, fibre fabric or the like may be added.

Particular advantage is obtained if the web parts 9 are not firstly attached to one another so as to form the transverse fibre web 10, but rather if the web parts 9 are immediately fed to a device where a longitudinal fibre layer can be applied to the web parts 9. The longitudinal fibre layer in this case joins together the web parts 9, the mutually adjoining web parts 9 forming the base stabilizing layer for the longitudinal fibre layer.

Figure 12:
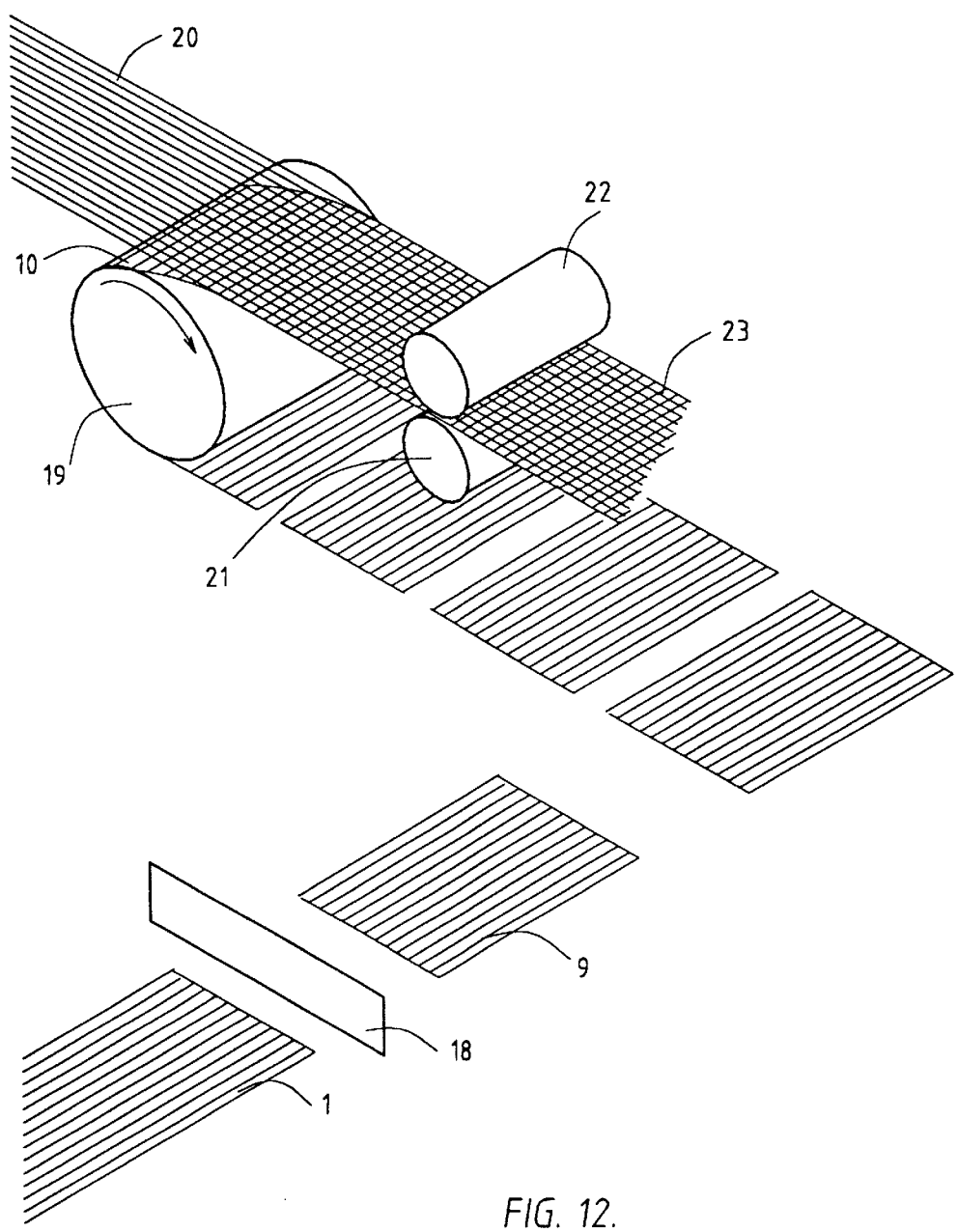
FIG. 12 is a diagrammatic depiction of a device for the production of a cross ply using the method according to the invention.

FIG. 12 diagrammatically depicts the device for carrying out a method of this kind. The longitudinal fibre web 1 is fed to the cutting device, where the longitudinal fibre web 1 is cut into web parts 9 by the cutting blade 18. The web parts 9 are conveyed to the device for producing a cross ply, with the direction of movement of the web parts 9 in the device standing at right angles to the direction of the fibres in the web parts 9. In the device, the web parts 9 are positioned in such a manner with respect to one another that they accurately adjoin one another on a roll 19 in a predetermined manner, so that a longitudinal fibre layer 20 can be applied thereto. The transverse fibre web 10 with the longitudinal fibre layer applied to it is guided between two rollers 21, 22, so that the transverse fibre web 10 and the longitudinal fibre layer 20 are firmly joined to one another. The result is a cross ply 23 on which tensile forces can be exerted in all directions.

What is claimed is:

1. Method for the production of a transverse fibre web with substantially parallel fibres in a fibre layer, the direction of the fibres in the fibre layer forming an angle of greater than 0° with the longitudinal direction of the transverse fibre web, comprising the following steps:

inseparably connecting a fibre layer to a base stabilizing layer so as to form a longitudinal fibre web with a first longitudinal side and a second longitudinal side, with the fibres in the fibre layer substantially parallel to the longitudinal direction of the longitudinal fibre web arranging a second stabilizing layer on that side of the fibre layer which is situated opposite the base stabilizing layer, cutting at least two web parts of predetermined dimensions off the longitudinal fibre web, each web part having a first longitudinal side and a second longitudinal side, which are substantially parallel to the fibres, and a first cut side and a second cut side, which are mutually parallel and form an angle of greater than 0° with the fibres, positioning the web parts with respect to one another in such a way that the web parts adjoin one another in a predetermined manner, attaching the web parts to one another so as to form the transverse fibre web.

2. Method according to claim 1, wherein the base stabilizing layer and the fibre layer are formed by an identical material.

3. Method according to claim 1, wherein the base stabilizing layer is formed by a film, a fibre fabric, in particular a nonwoven, or a thermosetting material.

4. Method according to claim 1, wherein the base stabilizing layer and the fibre layer and the second stabilizing layer are formed by an identical material.

5. Method according to claim 1, wherein the first longitudinal side of the longitudinal fibre web is of complementary form to the second longitudinal side of the longitudinal fibre web.

6. Method according to claim 5, wherein the edges of the fibre layer, the base stabilizing layer and the second stabilizing layer lie in one plane perpendicular to the plane of the layers.

7. Method according to claim 5, wherein the base stabilizing layer and the second stabilizing layer are displaced in the transverse direction with respect to one another and the fibre layer extends from the projecting edge of the base stabilizing layer to the projecting edge of the second stabilizing layer, interruptions in the fibre layer being arranged on that part of the base stabilizing layer which projects beyond the second stabilizing layer.

8. Method according to claim 1, further comprising the step of arranging a longitudinal fibre layer on the transverse fibre web.

* * * * *

UNITED STATES PATENT AND TRADEMARK OFFICE
CERTIFICATE OF CORRECTION

PATENT NO. : 6,425,969 B1  Page 1 of 1
DATED : July 30, 2002
INVENTOR(S) : Martinus C.A. van den Aker It is certified that error appears in the above-identified patent and that said Letters Patent is hereby corrected as shown below:

<u>Title page,</u>
Item [75], should read -- [75] Inventor: Martinus C.A. van den Aker
Tilberg (NL) --

Signed and Sealed this

Fifteenth Day of October, 2002

*Attest:*

*Attesting Officer*

JAMES E. ROGAN
*Director of the United States Patent and Trademark Office*